US008423171B2

(12) United States Patent
Sato et al.

(10) Patent No.: US 8,423,171 B2
(45) Date of Patent: Apr. 16, 2013

(54) METHOD FOR PROCESSING WORKPIECE IN TOOL MACHINE AND BEHAVIOR MEASUREMENT DEVICE

(75) Inventors: Yoshikatsu Sato, Ritto (JP); Shigeru Honda, Ritto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 518 days.

(21) Appl. No.: 12/665,629

(22) PCT Filed: Oct. 23, 2008

(86) PCT No.: PCT/JP2008/069221
§ 371 (c)(1),
(2), (4) Date: Feb. 2, 2010

(87) PCT Pub. No.: WO2009/060725
PCT Pub. Date: May 14, 2009

(65) Prior Publication Data
US 2010/0145499 A1    Jun. 10, 2010

(30) Foreign Application Priority Data

Nov. 5, 2007   (JP) ................. 2007-286909

(51) Int. Cl.
*G05B 19/404*   (2006.01)
(52) U.S. Cl.
USPC ........... 700/193; 352/152; 382/154; 382/152; 356/493; 73/1.79; 700/192; 33/636; 702/94
(58) Field of Classification Search .................. 700/193; 352/152; 382/154; 356/493
See application file for complete search history.

(56) References Cited

U.S. PATENT DOCUMENTS 5,444,640 A * 8/1995 Hirai .............................. 700/193
6,651,019 B2 * 11/2003 Mizuguchi et al. ............. 702/94
(Continued)

FOREIGN PATENT DOCUMENTS
EP   0 406 574 A1   1/1991
JP   61-131854 A    6/1986
(Continued)

OTHER PUBLICATIONS

Taiwanese Office Action dated Feb. 13, 2012.
(Continued)

*Primary Examiner* — Jeffrey A Gaffin
*Assistant Examiner* — Olvin Lopez Alvarez
(74) *Attorney, Agent, or Firm* — Birch, Stewart, Kolasch & Birch, LLP

(57) ABSTRACT

In a method for processing a workpiece in a tool machine, a first step (Step S4) for continuously measuring a position of a tip portion of a tool attached to a main axis, a second step (Step S5) for computing a displacement amount of the position of the tip point of the tool based on a result of the measurement, a third step (Step S8) for observing a time period while the displace amount is belonged in arrange of allowable displace amount previously determined, a fourth step (Step S9) for keeping an idling operation in case that the time for which the displace amount is belonged in the range of the allowable displacement amount is shorter than a time period previously determined and intermitting the idling operation in the case that the time for which the displace amount is belonged in the range of the allowable displacement amount become the time period previously determined and a fifth step (Step S10) for starting a process with respect to the workpiece in the case that the idling operation is finished are operated in order.

7 Claims, 3 Drawing Sheets

U.S. PATENT DOCUMENTS

| | | | |
|---|---|---|---|
| 6,973,738 B2 * | 12/2005 | Kaneda et al. | 33/636 |
| 7,120,288 B2 * | 10/2006 | Fujishima | 382/152 |
| 7,355,727 B2 * | 4/2008 | Turrini | 356/615 |
| 2002/0004688 A1 * | 1/2002 | Kojima et al. | 700/193 |
| 2003/0133131 A1 * | 7/2003 | Fujishima | 356/614 |
| 2006/0173573 A1 * | 8/2006 | Hosokawa et al. | 700/193 |

FOREIGN PATENT DOCUMENTS

| | | | |
|---|---|---|---|
| JP | 2-279254 A | | 11/1990 |
| JP | 5-84749 | * | 9/1991 |
| JP | 11-99448 | * | 4/1999 |
| JP | 11-99448 A | | 4/1999 |
| JP | 2000-158278 A | | 6/2000 |
| JP | 2004-195594 | * | 7/2004 |
| JP | 2004-261934 A | | 9/2004 |
| JP | 2005-34929 A | | 2/2005 |

OTHER PUBLICATIONS

Taiwanese Notice of Allowance mailed Jun. 27, 2012 with English Translation.

* cited by examiner

METHOD FOR PROCESSING WORKPIECE IN TOOL MACHINE AND BEHAVIOR MEASUREMENT DEVICE

This application is a national phase of PCT International Application No. PCT/JP2008/069221 filed on Oct. 23, 2008 under 35 U.S.C. §371. PCT/JP2008/069221 claims priority of Japanese Patent Application No. JP 2007-286909 filed on Nov. 5, 2007. The entire contents of each of the above-identified applications are hereby incorporated by reference.

BACKGROUND OF THE INVENTION

1. Field of the Invention

The present invention relates to a method for processing a workpiece in a tool machine and a behavior measurement device.

2. Description of the Related Art

In a tool machine, problems those a motor is heated up by rotating a main axis and feeding an axis for relatively adjusting a position of a tool machine with respect to a workpiece and a member for constituting a tool machine such as a main axis is thermally displaced correspond to an ambient temperature in a location of the tool machine. For example, a working depth processed by a tool machine with respect to a workpiece is varied. Such problems make a phenomenon that a relative position between the workpiece and a working tool is slightly slipped. The phenomenon makes a processing error with respect to the workpiece.

The processing error as described above is largely influenced by thermal displacement of a main axis caused by rotating particularly. In a conventional art, in order to maintain a processing accuracy, a rotation of an axis without loading so call as an idling operation is continued until a thermal displacement is converged. After a convergence of the thermal displacement, a workpiece is begun to be processed.

In an idling operation, that is, in a time period from a moment when an idling operation time is started to a moment when a thermal displacement of a main axis is converged is varied corresponding to environment conditions at a space where a tool machine is located and a processing command with respect to the tool machine, so that an expert operator has to judge the time period with his/her best knowledge. Alternatively, the idling operation time is previously determined regardless of a rotational speed of a main axis influenced by thermal displacement. Therefore, a workpiece might be begun to be processed before a moment when the thermal displacement of the main axis is converged. Even if the idling operation time of the tool machine might be longer than a necessary time period that the tool machine is required. These are a reason why a working efficiency of the tool machine is lowered.

Concerning with these problems, a patent document 1 as described below discloses a tool machine comprising a device for measuring a position of a tool wherein a tip point of a sword is periodically measured and an idling operation is intermitted in the condition that a measured displacement amount of the tip point of the sword of the tool machine is within a range of acceptable error.

Patent Document 1: Japanese Patent Unexamined Document 2004-261934.

SUMMARY OF THE INVENTION

The Subject to be Solved by the Invention

However, in the patent document 1, a measurement device periodically measures a tip point of a sword of a tool with a predetermined interval and judges whether a measured displacement amount of the tip point of the sword is within a range of an acceptable error or not by comparing with a measured displacement amount and a displacement previously measured amount. For example, in the case that a relative position of a workpiece with respect to a tip point of a tool is not simply shifted toward one direction but the relative position is unstably changed such as a corrugate line, if a measured displacement amount at the last time is the same to the displacement amount measured at a previous time (for example, both of the displacements may be at a peak of mountains in the corrugate line), the measurement device is apt to judge that the thermal displacement is converged. Further, although it would be considerable that a tip point of a tool is shifted to a direction different from an axial direction of a main axis, a measurement device could not measure such a displacement. Therefore, a processing accuracy and a processing efficiency of such a measurement device are seriously lowered.

According to the above drawbacks, a purpose of the invention is to provide a method for processing workpiece in a tool machine, wherein a redundant idling operation is avoided and the tool machine can begin processing a workpiece at a timing when thermal displacement of a main axis and so on are converged and a certain processing accuracy can be maintained.

Means to Solve the Subject

To solve the above subject, a method for processing a tool machine according to the first invention is a method for processing a workpiece in a tool machine for processing the workpiece by relatively moving a tool with respect to the workpiece. The method for processing the workpiece is characterized of comprising a first step for continuously measuring a position of a tip point of a tool attached to an main axis, a second step for computing a displacement amount of the position of the tip point of the tool based on a result of a measurement in order, a third step for observing whether the displacement amount of the position of the tip point of the tool is within a range of an allowable accuracy previously determined for a certain time period in order to judge whether the position of the tip portion of the tool thermally displaced is converged or not, a fourth step for keeping an idling operation in the case that a time period that the displacement amount is within the range of the allowable accuracy is shorter than the certain time period previously determined so as to judge whether the position of the tip portion of the tool thermally displaced is converged or not and intermitting the idling operation in the case that the period that the displacement amount is within the range of the allowable accuracy is equal or longer than the certain time period previously determined and a fifth step for starting on processing the workpiece in the case that the idling operation is intermitted in the fourth step.

A method for processing a workpiece in a tool machine according to the second invention is characterized in that a measurement step is corresponding to the step for measuring according to the first invention and measures the position of the tip point of the tool in a two dimensional mode or a three dimensional mode.

A method for processing a workpiece in a tool machine according to the third invention is characterized of further comprising an additional step between the second step and the third step in the first invention or the second invention. The additional step maintains a measurement of the position of the tip point of the tool until a time period from starting the measurement of the position of the tip point of the tool passing over the longest measurement time period previously determined and stops the measurement of the position of the tip point of the tool after the period from starting the measurement of the position of the tip point of the tool passing over the longest measurement time period previously determined after finishing the second step for computing the displacement amount of the position of the tip point of the tool.

A behavior measurement device for processing a workpiece in a tool device according to the fourth invention is a behavior measurement device for processing a workpiece in the tool machine by controlling a relative position of a tool with respect to the workpiece in a tool machine. The behavior measurement device in the tool machine is characterized of comprising measurement means for continuously measuring a position of a tip point of the tool in a two dimensional mode or a three dimensional mode and control means for computing a displacement amount of the position of the tip point of the tool based on a result measured by the measurement means, observing a time period for which the displacement amount is maintained in a range of allowable displacement amount previously set, keeping an idling operation in case that the time period for which the displacement amount is maintained in a range of allowable displacement amount previously set is shorter than an allowable displacement maintaining time period previously set, and stopping the idling operation in case that the time period in which the displacement amount is maintained in a range of allowable displacement amount previously set is equal or longer than the allowable displacement maintaining time period previously set.

A behavior measurement device in the tool machine according to the fifth invention is characterized in that the measurement mean according to the fourth invention is photograph means for periodically photographing the position of the tip point of the tool at a constant time interval and the control means compute a displacement of the position of the tip point of the tool based on an image photographed by the photograph means.

A behavior measurement device in the tool machine according to the sixth invention is characterized in that the measurement means according to the fourth invention is a laser interferometer.

Effects of the Invention

In accordance with a behavior measurement method in a tool machine according to the first invention, the method processes a workpiece in a tool machine by relatively moving a tool with respect to the workpiece. The method comprises a first step for continuously measuring a position of a tip point of a tool attached to an main axis, a second step for computing a displacement amount of the position of the tip point of the tool based on a result of a measurement in order, a third step for observing whether the displacement amount of the position of the tip point of the tool is within a range of an allowable accuracy previously determined for a certain time period in order to judge whether the position of the tip portion of the tool thermally displaced is converged or not, a fourth step for keeping an idling operation in the case that a time period that the displacement amount is within the range of the allowable accuracy is shorter than the certain time period previously determined so as to judge whether the position of the tip portion of the tool thermally displaced is converged or not and intermitting the idling operation in the case that the period that the displacement amount is within the range of the allowable accuracy is equal or longer than the certain time period previously determined and a fifth step for starting on processing the workpiece in the case that the idling operation is intermitted in the fourth step. An unnecessary idling operation can be avoided. A workpiece can be begun to be processed after completely conversing a thermal displacement so that a processing accuracy can be improved.

In a method for processing a workpiece in a tool machine according to the second invention, the position of the tip point of the tool is measured in a two dimensional mode or a three dimensional mode so that the workpiece can be processed by considering a thermal displacement of the whole body of the tool machine regardless any displacement directions of the tool in addition to an axial direction of the main axis. Therefore, the processing accuracy can be improved.

In a method for processing a workpiece in a tool machine according to the third invention, an additional step is provided between the second step and the third step. The additional step maintains a measurement of the position of the tip point of the tool until a time period from starting the measurement of the position of the tip point of the tool passing over the longest measurement time period previously determined and stops the measurement of the position of the tip point of the tool after the period from starting the measurement of the position of the tip point of the tool passing over the longest measurement time period previously determined after computing the displacement amount of the position of the tip point of the tool. Therefore, in the case that a position of a tip point of a tool is not stable after passing over the longest measurement time period, an idling operation can be intermitted by considering that any trouble is happened. An unnecessary idling operation can be avoided.

In a behavior measurement device for processing a workpiece in a tool device according to the fourth invention, a behavior measurement device for processing a workpiece in the tool machine controls a relative position of a tool with respect to the workpiece in a tool machine. The behavior measurement device comprises measurement means for continuously measuring a position of a tip point of the tool in a two dimensional mode or a three dimensional mode and control means for computing a displacement amount of the position of the tip point of the tool based on a result measured by the measurement means, observing a time period for which the displacement amount is maintained in a range of allowable displacement amount previously set, keeping an idling operation in case that the time period for which the displacement amount is maintained in a range of allowable displacement amount previously set is shorter than an allowable displacement maintaining time period previously set, and stopping the idling operation in case that the time period in which the displacement amount is maintained in a range of allowable displacement amount previously set is equal or longer than the allowable displacement maintaining time period previously set. An unnecessary idling operation can be avoided and a workpiece can be begun to be processed in a certain stably condition so that a processing time including an idling operation time can be shortened and a processing accuracy can be improved.

In a behavior measurement device in the tool machine according to the fifth invention, the measurement mean is photograph means for periodically photographing the position of the tip point of the tool at a constant time interval and the control means compute a displacement of the position of the tip point of the tool based on an image photographed by the photograph means. Therefore, even if a position of a tip point of a tool is displaced toward a direction perpendicular to an axial direction of the tool, a displacement amount can be measured and a processing accuracy of the tool machine can be improved.

In a behavior measurement device in the tool machine according to the sixth invention is characterized in that the measurement means according to the fourth invention is a laser interferometer. Therefore, even if a position of a tip point of a tool is displaced toward a direction perpendicular to an axial direction of the tool, a displacement amount can be measured and a processing accuracy of the tool machine can be improved.

DETAILED DESCRIPTION OF THE INVENTION

Figure 1:
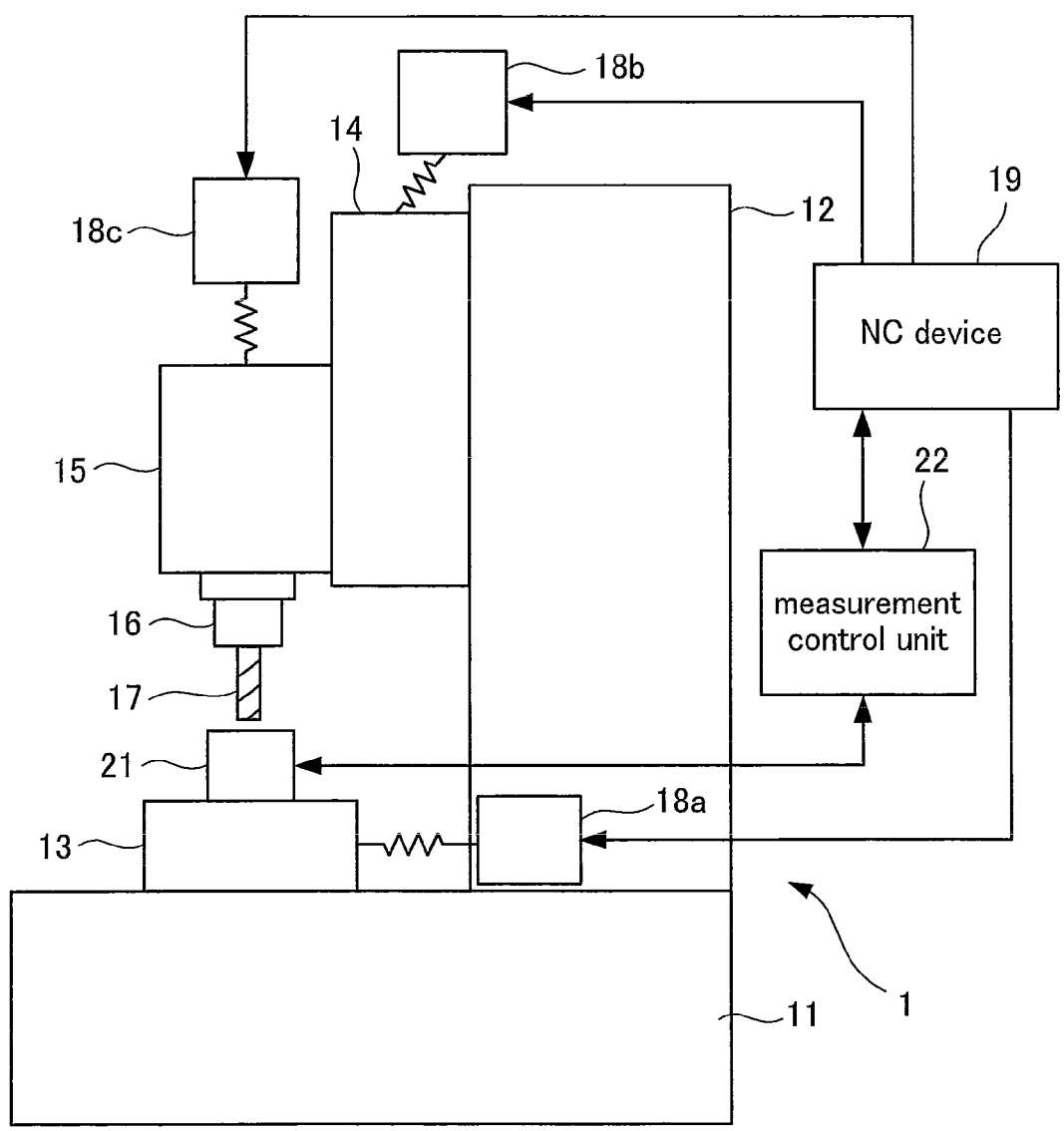
FIG. 1 is a block diagram for showing an embodiment of a behavior measurement of a tool machine according to the present invention.
Figure 2:
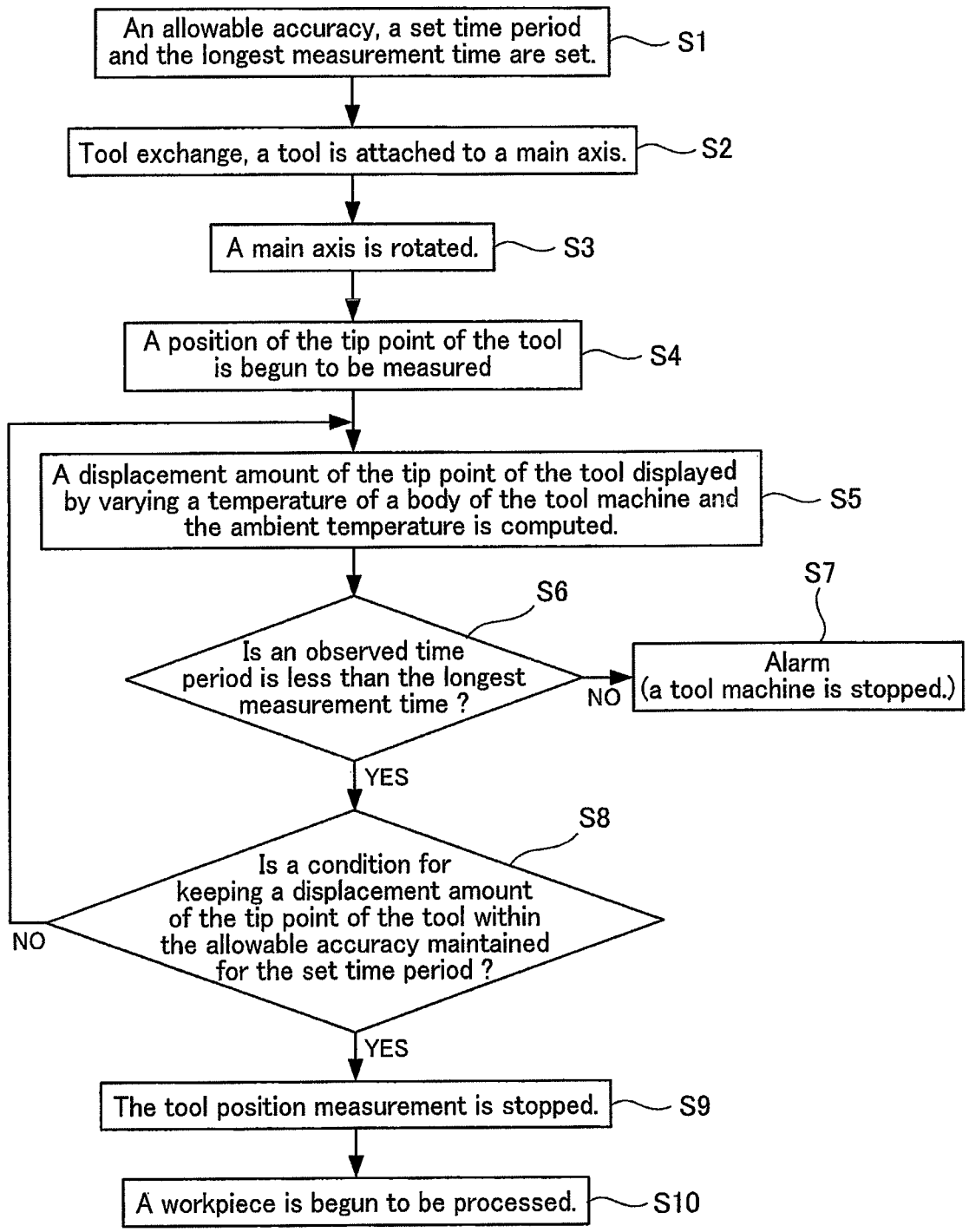
FIG. 2 is a flow chart of the embodiment for showing an operation of the behavior measurement according to the present invention.
Figure 3:
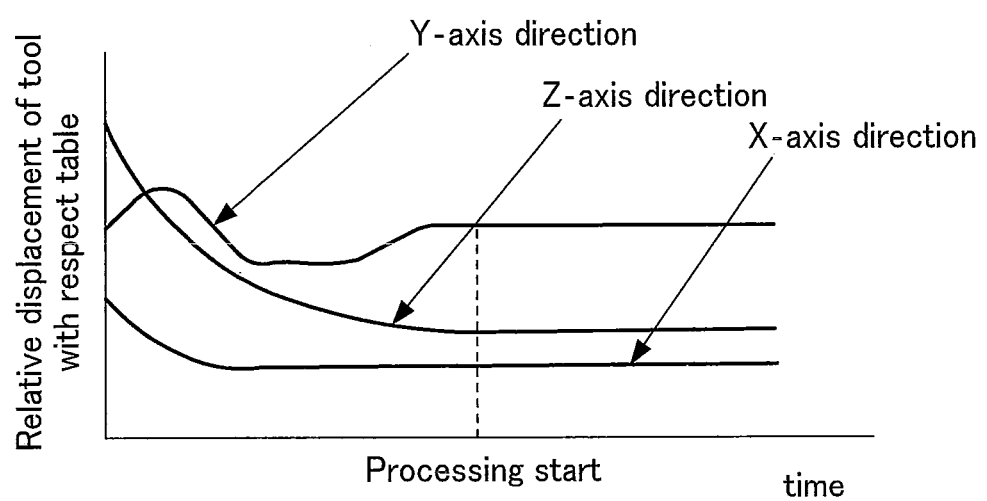
FIG. 3 is a graph for showing a relation between a relative displacement of a tool with respect to a table of the tool machine and a time period, wherein a position of the tool is slightly changed corresponding to thermal influence caused by a rotation of a main axis in the behavior measurement according to the present invention.

One embodiment of the present invention will be described hereinafter with reference to FIG. 1 through FIG. 3. FIG. 1 is a block diagram for showing an embodiment of a behavior measurement of a tool machine according to the present invention. FIG. 2 is a flow chart of the embodiment for showing an operation of the behavior measurement according to the present invention. FIG. 3 is a graph for indicating a relation between a relative displacement of a position of a tool of which a main axis is rotating with respect to a table and a time period.

As shown in FIG. 1, a tool machine 1 comprises a bed 11, a column 12, a table 13, a saddle 14, a main axis head 15 and a main axis 16 and so on. In particularly, on the bed 11 constituting a body of the tool machine 1, the column 12 and the table 13 are mounted. The saddle 14 is slidably supported at the column 12 and the saddle 14 is movable along a right-lift direction (in FIG. 1, the direction is perpendicular to a sheet and hereinafter called as "X-axis"). The main axis head 15 is slidably supported at the saddle 14 and moved along an axial direction of a tool 17 as described below (a vertical direction in FIG. 1, hereinafter it is referred as "Z-axis"). The main axis 16 is rotatably supported on the main axis head 15 and the tool 17 is attached to the main axis 16. The table 13 is movably supported along a front-rear direction (the direction is perpendicular to the X-axis and the Z-axis and hereinafter it is referred as "Y-axis") at a location in front of the column 12.

The table 13 is moved along the Y-axis by a servo motor 18a, the saddle 14 is moved along the X-axis by a servo motor 18b and the main axis head 15 is moved along the Z-axis by a servo motor 18c. The main axis 16 is rotated around an axial line by motor (not shown). The motor for driving the main axis and the servo motors 18a, 18b and 18c are controlled in accordance with each command output from a numerical control (NC) device 19. The NC device 19 is a control unit for operating a rotation of the main axis 15 and the servo motors 18a, 18b and 18c in accordance with various programs recorded therein.

As described above, in accordance with various commands from the NC device 19, a movement of the table 13, the saddle 14 and the main axis head 15 is controlled so that a workpiece (not shown) mounted and fixed on the table 13 is while a relative position of the workpiece with respect to the tool 17 is changed.

For example, a measurement device 21 comprises an image photograph means such as a camera and so on in order to photograph an image of a tip point of the tool 17 periodically and continuously at a constant interval so that a change of a relative position of the tip point of a sword of the tool 17 with respect to the table 13 (or the workpiece) caused by a thermal displacement of the main axis can be continuously measured in a two dimensional mode or a three dimensional mode.

The measurement device 21 is connected to the NC device 19 through the measurement control unit 22. The measurement control unit 22 has at least an image processing function for computing a displacement amount of the tip point of the tool 17 based on numerical data of the tip point of the tool which is transferred from an image photographed by the measurement device 21 and an observing function for observing the displacement amount of the tip point of the tool 17 while the displacement amount is belonged in a range of an acceptable accuracy as described below. The measurement control unit 22 outputs a start command for measuring a position of a tool with respect to the measurement device 21 in accordance with the NC device 19 or an end command for finishing a measurement of the position of the tool with respect to the both of the NC device 19 and the measurement device 21 in accordance with the result of the measurement of the position of the tip point of the tool. Thus, the measurement control unit 22 is a unit for controlling a tool position measurement by the measurement device 21.

An embodiment of a behavior measurement for measuring a tip point of a tool 17 according to the present invention will be described with reference to FIG. 2.

As shown in FIG. 2, in the case that a workpiece is processed by a new tool, a first step (S1) is to set reference values in order to judge whether a position of a tip point of a tool 17 which is relatively displaceable with respect to a table 13 due to a thermal displacement of a body of a tool machine and an ambient temperature in a space where the tool machine is located and so on is converged to a stable range or not. In the embodiment, the reference values include an allowable accuracy, a set time period and the longest measurement time.

The allowable accuracy and the set time period are factors for judging whether a thermal displacement caused by the tool machine is converged and a displacement of the tip point of the tool 17 is stopped. The allowable accuracy means that a relative displacement of the tip point of the tool 17 with respect to the table 13 is equal or less than a predetermined reference value while a predetermined time period is passed. If the relative displacement is in the allowable accuracy, it is judged that the tool 17 is in a stable condition. The set time period is a time for keeping a condition that the tip point of the tool 17 is displaced within the allowable accuracy as described above. If the allowable accuracy is maintained for the set time period (for instance, 5 minute), it is judged that a displacement of the tool 17 is converged.

The longest measurement time is provided to stop measuring a tip point of the tool 17 in the case that the tip point of the tool 16 cannot be converged for any reason.

After setting reference values in the step S1, a necessary tool 17 is attached to a main axis 16 in stead of a tool formally attached by exchanging tools (Step S2) and then a main axis 16 is rotated, that is, idling operation is started (Step S3). The measurement device 21 outputs a command to the NC device 19 through the measurement control unit 22 and a measurement of the tip point of the tool (tool position measurement) is started by the measurement device 21, that is, an image of the tip point of the tool 17 is begun to be photographed in the embodiment (Step S4). The image of the tip point of the tool 17 is continuously photographed at a predetermined time interval.

In the next step, for example, an image of a shape of the tool 17 and a position of the tool 17 photographed by the measurement device 21 are transferred to numerical data. Two successive image data, a new image data and the previous image data, are compared and analyzed so as to compute a displacement amount of the tip point of the tool displaced by varying a temperature of a body of the tool machine and the ambient temperature (Step S5). In the next step, it is judged whether a measurement time period is shorter than the longest measurement time previously set (Step S6). If the measurement time period is over the longest measurement time (NO), the tool machine 1 is stopped for indicating an alarming condition or ringing alarming sounds (Step S7).

On the other hand, if an actual measurement time period is shorter than the longest measurement time previously set (YES), it is judged that a position of a tip point of the tool 17 is maintained within the allowable accuracy. On the other hand, it is judged whether a condition for keeping a displacement amount of the tip point of the tool within the allowable accuracy is maintained for the set time period or not (Step S8). As the result, unless a condition for keeping the displacement amount of the tip point of the tool 17 within the allowable accuracy is maintained for the set time period (NO), the idling operation is maintained and the operation is returned to the Step S5.

On the other hand, if a condition for keeping a displacement amount of the tip point of the tool 17 within the allowable accuracy is continuously maintained for the set time period (YES), it is judged that the position of the tip point of the tool 17 is converged and then the tool position measurement is stopped (Step S9). The idling operation is stopped and a workpiece is begun to be processed (step S10).

FIG. 3 shows one embodiment of a behavior of the tip point of a tool 17. In a tool machine 1, it is considered that a relative position of a tip point of a tool 17 with respect to a workpiece is displaced toward the X-direction, the Y-direction and the X-direction, respectively caused by a reason why a bed 11, a column 12, a saddle 14, a main axis head 15 and a main axis 16 and so on which constitute a tool machine 1 are thermally displaced by heating up the main axis head 15 and servo motors 18*a*, 18*b* and 18*c* so as to rotate the main axis and feed the table 13, the saddle 14 and the main axis head 15 and a respective time period for setting them in a stable condition is different in X, Y and Z-directions each other. However, in a behavior measurement method according to the present invention, a position of a tip point of a tool 17 is continuously measured in a two dimensional mode or a three dimensional mode. If a condition for keeping a displacement amount of the position of the tip point of the tool 17 within the allowable accuracy is maintained for the set time period, the measurement device 21 judges that the behavior of the tool machine is converged so that the idling driving is stopped. Therefore, even if a time period that a thermal displacement amount of the main axis 16 is converged and a time period that a thermal displacement amount of the tool 17 is converged are different with corresponding to an ambient temperature in a space located at the tool machine 1 and conditions operated by the tool machine, it is certainly possible to judge whether a behavior of the tool machine is converged and prevent the tool machine from processing a workpiece before the convergence of the behavior of the tool machine and to start for processing a workpiece in a stable condition without continuing a redundant idling operation. As shown in FIG. 3, while a relative position of the tool with respect to a table is certainly in a stable condition, a redundant idling operation can be avoided and a process of the workpiece can be started. Upon comparing with the conventional art and the present invention, the present invention is superior to the conventional art in view of a process accuracy and a processing efficiency.

Although idling driving has to be operated based on an expert's knowledge in a conventional art, an idling operation is efficiently operated without the expert's knowledge in the present invention. Thus, the present invention is very convenient.

In the embodiment as described above, image photograph time means is a measurement device 21 wherein a tip point of the tool 17 is periodically photographed at a constant interval. However, a measurement device may comprise a transmitting portion for transmitting a lot of laser beams along a direction perpendicular to an axial direction of a main axis 16 and a receiving portion for receiving light beams at a opposite position with respect to the transmitting portion, wherein a tool 17 is located between the transmitting portion. Thus, the receiving portion and the receiving portion obtains an information of a position of the tool 17 by utilizing a fact that a laser beam is shut by the tool 17 thermally displaced. Alternatively, the measurement device 21 may comprise a laser interferometer capable of measuring a displacement of a tip point of a tool 17 towards thee axes in a two dimensional mode or a three dimensional mode. The measurement device 21 can be modified within an essence of the present invention. In the case that a tip point of the tool 17 is measured in the two dimensional mode, for example, in the case that a displacement of the tip point of the tool 17 is measured by the two dimensional mode as shown in FIG. 3, it is preferable that a behavior of the tip point is measured depending on a condition, that is, the behavior of the tip point is only measured along the Y-axis and the Z-axis.

INDUSTRIAL UTILITY OF THE INVENTION

The present invention is suitable for a behavior measurement in a tool machine and a method for processing therein.

The invention claimed is:

1. A method of processing a workpiece in a tool machine for processing said workpiece by relatively moving a tool with respect to said workpiece, said method comprising:

a first step of continuously measuring a position of a tip point of a tool attached to a main axis;

a second step of computing a displacement amount of said position of said tip point of said tool based on a result of a measurement in order;

a third step of observing whether said displacement amount of said position of said tip point of said tool is within a range of an allowable accuracy previously determined for a certain time period in order to judge whether said position of said tip portion of said tool thermally displaced is converged or not;

a fourth step of keeping an idling operation in the case that a time period that said displacement amount is within said range of said allowable accuracy is shorter than said certain time period previously determined so as to judge whether said position of said tip portion of said tool thermally displaced is converged or not and intermitting said idling operation in the case that said period that said displacement amount is within said range of said allowable accuracy is equal or longer than said certain time period previously determined; and a fifth step of starting processing said workpiece in the case that said idling operation is intermitted in said fourth step.

2. A method of processing a workpiece in a tool machine as claimed in claim 1, wherein said position of said tip point of said tool is measured in one of a two dimensional mode and a three dimensional mode.

3. A method of processing a workpiece in a tool machine as claimed in claim 1, said method further comprising:
between the second and third steps,
a step of maintaining a measurement of said position of said tip point of said tool until a time period from starting said measurement of said position of said tip point of said tool passing over a longest measurement time period previously determined and stopping said measurement of said position of said tip point of said tool after said period from starting said measurement of said position of said tip point of said tool passing over the longest measurement time period previously determined.

4. A method of processing a workpiece in a tool machine as claimed in claim 2, further comprising:
between the second and third steps,
a step of maintaining a measurement of said position of said tip point of said tool until a time period from starting said measurement of said position of said tip point of said tool passing over a longest measurement time period previously determined and stopping said measurement of said position of said tip point of said tool after said period from starting said measurement of said position of said tip point of said tool passing over the longest measurement time period previously determined.

5. A behavior measurement device for processing a workpiece by controlling a relative position of a tool with respect to said workpiece in a tool machine, said behavior measurement device comprising:
measurement means that continuously measures a position of a tip point of said tool in one of a two dimensional mode and a three dimensional mode; and
control means that computes a displacement amount of said position of said tip point of said tool based on a result measured by said measurement means, observes a time period for which said displacement amount is maintained in a range of allowable displacement amount previously set, keeps an idling operation in case that said time period for which said displacement amount is maintained in a range of allowable displacement amount previously set is shorter than an allowable displacement maintaining time period previously set, and stops said idling operation in case that said time period in which said displacement amount is maintained in a range of allowable displacement amount previously set is equal or longer than said allowable displacement maintaining time period previously set.

6. A behavior measurement device in said tool machine as claimed in claim 5, wherein said measurement mean is photograph means that periodically photographs said position of said tip point of said tool at a constant time interval and said control means compute a displacement of said position of said tip point of said tool based on an image photographed by said photograph means.

7. A behavior measurement device in said tool machine as claimed in claim 5, wherein said measurement means is a laser interferometer.

* * * * *